(12) United States Patent
Lynch

(10) Patent No.: US 7,950,032 B1
(45) Date of Patent: May 24, 2011

(54) RATINGS CONTROL SYSTEM WITH TEMPORARY OVERRIDE CAPABILITY

(75) Inventor: David Johnston Lynch, Hamilton, IN (US)

(73) Assignee: Thomson Licensing, Boulogne Cedex (FR)

( * ) Notice: Subject to any disclaimer, the term of this patent is extended or adjusted under 35 U.S.C. 154(b) by 0 days.

(21) Appl. No.: 09/475,448

(22) Filed: Dec. 30, 1999

(51) Int. Cl.
H04N 7/16 (2006.01)
(52) U.S. Cl. .............. 725/28; 725/27; 348/460
(58) Field of Classification Search .......... 725/25–31; 348/460, 515, 565, 906
See application file for complete search history.

(56) References Cited

U.S. PATENT DOCUMENTS

| | | | | |
|---|---|---|---|---|
| 4,930,158 A | * | 5/1990 | Vogel | 386/94 |
| 4,930,160 A | * | 5/1990 | Vogel | 725/30 |
| 5,168,372 A | * | 12/1992 | Sweetser | 725/29 |
| 5,382,983 A | * | 1/1995 | Kwoh et al. | 348/716 |
| 5,465,113 A | * | 11/1995 | Gilboy | 725/29 |
| 5,550,575 A | * | 8/1996 | West et al. | 725/28 |
| 5,589,892 A | * | 12/1996 | Knee et al. | 725/43 |
| 5,828,402 A | * | 10/1998 | Collings | 725/28 |
| 5,949,471 A | | 9/1999 | Yuen et al. | 348/5.5 |
| 5,969,748 A | * | 10/1999 | Casement et al. | 725/27 |
| 5,973,683 A | * | 10/1999 | Cragun et al. | 345/719 |
| 5,995,133 A | * | 11/1999 | Kim | 725/28 |
| 6,020,882 A | * | 2/2000 | Kinghorn et al. | 345/716 |
| 6,025,869 A | * | 2/2000 | Stas et al. | 725/28 |
| 6,038,367 A | * | 3/2000 | Abecassis | 386/46 |
| 6,091,886 A | * | 7/2000 | Abecassis | 386/125 |
| 6,100,916 A | * | 8/2000 | August et al. | 725/28 |
| 6,115,057 A | * | 9/2000 | Kwoh et al. | 725/28 |
| 6,125,259 A | * | 9/2000 | Perlman | 725/28 |
| 6,133,909 A | * | 10/2000 | Schein et al. | 345/721 |
| 6,137,486 A | * | 10/2000 | Yoshida et al. | 345/719 |
| 6,144,401 A | * | 11/2000 | Casement et al. | 725/30 |
| 6,177,931 B1 | * | 1/2001 | Alexander et al. | 725/52 |
| 6,181,364 B1 | * | 1/2001 | Ford | 725/32 |
| 6,212,679 B1 | * | 4/2001 | Vornsand | 725/25 |
| 6,226,793 B1 | * | 5/2001 | Kwoh | 725/28 |
| 6,230,320 B1 | * | 5/2001 | Gakumura | 725/25 |
| 6,286,141 B1 | * | 9/2001 | Browne et al. | 725/39 |
| 6,359,661 B1 | * | 3/2002 | Nickum | 348/734 |
| 6,481,009 B1 | * | 11/2002 | Miyakoshi | 725/28 |
| 6,662,365 B1 | * | 12/2003 | Sullivan et al. | 725/25 |
| 6,760,915 B2 | * | 7/2004 | deCarmo | 725/28 |
| 7,047,547 B2 | * | 5/2006 | Alten et al. | 725/28 |
| 7,200,852 B1 | * | 4/2007 | Block | 725/28 |
| 2002/0013941 A1 | * | 1/2002 | Ward, III et al. | |
| 2004/0040034 A1 | * | 2/2004 | Sullivan et al. | 725/25 |

FOREIGN PATENT DOCUMENTS

| | | |
|---|---|---|
| WO | WO98/53609 | 11/1998 |
| WO | WO9944361 | 9/1999 |

* cited by examiner

*Primary Examiner* — Annan Q Shang
(74) *Attorney, Agent, or Firm* — Robert D. Shedd; Harvey D. Fried; Joel M. Fogelson

(57) ABSTRACT

A system and related apparatus for comprising a video processing system having a ratings control system which blocks or permits viewing of programs which are broadcast with ratings or spending information according to a profile set by a supervisor who has entered a password accepted by the control system, in which supervisor can temporarily modify the profile. After completion of the time period(s) or supervisor-designated television broadcast(s) or programs, the system automatically returns to the normal profile.

20 Claims, 1 Drawing Sheet

RATINGS CONTROL SYSTEM WITH TEMPORARY OVERRIDE CAPABILITY

BACKGROUND

This invention relates to systems for blocking viewing or recording of television programs which exceed a ratings, spending limit, or other viewing limitation set by a supervisor.

Video signal processing systems such as television tuners contained in television sets, video cassette recorders, or cable boxes which are suitable for coupling to a display device such as a picture tube and which contain circuitry and software designed to prevent viewing of programs containing ratings information below a level set by a supervisor, commonly known as "V-chip," or exceeding spending limits in pay-per-view systems, are known. The so-called V-chip is a programmed processor which allows the supervisor with a password, usually a parent, to set a ratings level, so that supervised viewers such as young children cannot view "higher" rated broadcasts.

A device or system that provides ratings control permits a user to prevent certain programs and/or scenes from being viewed and heard based on certain criteria, e.g., the content of the program/scenes or the subscription cost. For example, a parent might specify that programs and/or scenes including violent subject matter should be excluded. Alternatively, a supervisor can specify a rating limit, such as PG-13, and programs and scenes exceeding that limit (e.g., R and X rated programs) could not be viewed or heard. The adult with the password can also limit the use of pay-per-view or can limit the pay-per-view spending limit. By decoding program content information included in an auxiliary information component of a television signal, e.g., Extended Data Services (XDS) data included in an NTSC television signal in the United States or PSIP data included in an ATSC television signal, a television receiver containing a data "stripper" (i.e., data decoder) can "slice" (i.e., extract) information from the television signal (e.g., from the vertical blanking interval (VBI) of an NTSC signal or from PSIP data in an ATSC signal), decode the data to determine the content and rating of television programs and scenes, and compare the content and rating to the limits set by a user. When V-Chip ratings control is activated by the a viewer who has the proper authorization (hereinafter referred to as "supervisor" or "parent"), and a ratings limit is set, the processor within the receiver utilizes a "stripper" which functions to slice, or extract, ratings information contained in the television signal for most broadcast programs and channels. When the ratings information exceeds the value elected by the authorized supervisor, the processor is designed to blank the screen and mute the audio portion of the broadcast. For television receivers which also have multi-image display capability, i.e., produce a display containing main and auxiliary images (e.g., systems that provide picture-in-picture (PIP) or picture-outside-picture (POP) features), the receiver must provide ratings control for both main and auxiliary programs if both main and auxiliary pictures are displayed and the supervisor has activated ratings control. For those programs and scenes that exceed the specified limits, the system causes the video display to be modified, e.g., blanked, and the audio is muted. In addition, the system may display a message indicating the reason for the interrupted reception and the expected duration of the interruption (e.g., SCENE EXCEEDS CONTENT LIMIT). The supervisor may also deactivate the V-chip ratings control by choosing to permit any level of broadcast to be displayed; in such case no blocking of program content by rating takes place.

The supervisor may also have the option to set other limits such as spending for "pay per view" events and/or accumulated time that a viewer has access to the system. The viewer or class of viewers can be identified by a profile which can be given a name such as "children," "parents," and the like. Each profile is a collection of permission levels.

Some existing systems use multiple profiles, for example a profile for a younger child, a second profile for an older child, and a third profile for the parents. Each profile may have a different ratings limit and pay-per-view spending limit The ratings in the current "V-chip" system uses a ratings system as follows, from the most permissive to the most restrictive:

| | |
|---|---|
| TV-Y | All children |
| TV-Y7 | Directed to children age 7 and above |
| TV-7-FV | Contains fantasy violence or comedic violence, but otherwise directed to age 7 and above |
| TV-G | Appropriate for all ages, containing little or no violence, sex, or adult language |
| TV-PG | Unsuitable for younger children |
| TV-PG-V | Contains higher level of violence than average TV-PG |
| TV-PG-S | Contains higher level of sexual situations than average TV-PG |
| TV-PG-L | Contains higher level of coarse language some suggestive dialogue than average TV-PG |
| TV-14 | M |
| TV-MA | Mature audience only, unsuitable for children under 17 years of age |

The V-chip can also be set to block Motion Picture of America (MPAA) rated movies above a supervisor-set level for movies on cable TV which have not been edited for television and retain their original rating, according to the following ratings system:

| | |
|---|---|
| G | General audiences |
| PG | Parental guidance suggested, may not be suitable for all children |
| PG-13 | Parents strongly cautioned. Some material may be inappropriate for children under 13 |
| R | Restricted, under 17 requires a parent or guardian |
| NC-17 | No one under 17 admitted |

With currently available technology, in situations where the supervisor wishes to permit viewing of a particular television broadcast when the supervised person or group is not present, for example if the children are asleep and the parents wish to watch an NC-17-rated movie broadcast on cable TV, the supervisor must reset the ratings limit, set the profile to the parent profile (in a multiple profile system) or completely unlock the system using the password, and then the more restrictive level must be reset so that the children's restriction limit is restored.

Due to the inconvenience of having to reset the ratings limit or completely unlocking the system after completion of the special broadcast, many supervisors do not remember or do not bother to reset the ratings or restore the active profile to the normal profile, and thereby fail to effectively use the ratings control system to its full advantage. The present invention addresses that problem.

SUMMARY OF THE INVENTION

The present invention comprises a video signal processing system such as a television receiver, cable box, or VCR tuner for producing an output signal suitable for coupling to a display device to produce a displayed image, the video processing system having a supervisor control system, such as a specially modified V-chip, which blocks viewing of programs which are received with embedded ratings information or spending information, authorized view time, or other condition which is outside a range selected by a supervisor, such as a parent, and comprises an improvement which permits the supervisor to enter one or more temporarily revised limits or permit specific programs to be viewed. At the end of the temporary period or completion of the specific programs permitted by the supervisor, the system of the invention automatically restores the normal ratings and/or spending limit for the selected profile(s). Children and others who do not have the supervisory password can not change the ratings control range or temporarily override blocking. Preferably the system comprises means for the supervisor who has entered the password accepted by the control system to enter (A) one or more specific broadcast programs to be unblocked, (B) one or more channels to be unblocked for one or more specific time periods, (C) a revised ratings profile for a specific time period, or (D) a revised spending limit. Another preferred feature is for the processor to be programmed to display a status listing of programs or channels unblocked and the corresponding time periods, or to display the status of the remaining spending authorization for a profile.

The invention also comprises a method for blocking viewing or recording of television programs which are broadcast with ratings information or spending information which is outside a range selected by a supervisor comprising (A) receiving one or more profiles comprising ratings and/or limits for each profile from a supervisor, (B) receiving override information from a supervisor corresponding to one or more modified profiles which specify one or more permitted television programs, one or more permitted channels to be unblocked for one or more specific time periods, or a revised ratings range for one or more specific time periods, (C) blocking viewing or recording of television programs outside the current normal ratings limit profile but permitting viewing of unblocked channels, unblocked television programs, or programs within the temporarily revised ratings limit.

In another aspect, the invention comprises a ratings control system comprising means to block programs which are broadcast with ratings information or spending information which is outside a profile having a range selected by a supervisor, means for a supervisor to enter a password and select a program, channel, or time period to which the normal ratings control range or spending limit for the profile is temporarily revised, and means to automatically restore the normal ratings control range at the expiration of the selected time period(s) or completion of the selected program(s).

Another aspect is a processor which normally blocks viewing of programs or recordings outside a viewer profile entered by a supervisor, which permits or denies viewing of programs according to temporary override(s) instructions entered by the supervisor, and which returns to normal blocking profile after expiration of a time period set by the supervisor, or by removal of the override(s) by the supervisor, or after completion of the programs or recordings permitted in the temporary override(s) instructions.

DETAILED DESCRIPTION OF THE INVENTION

Figure 1:
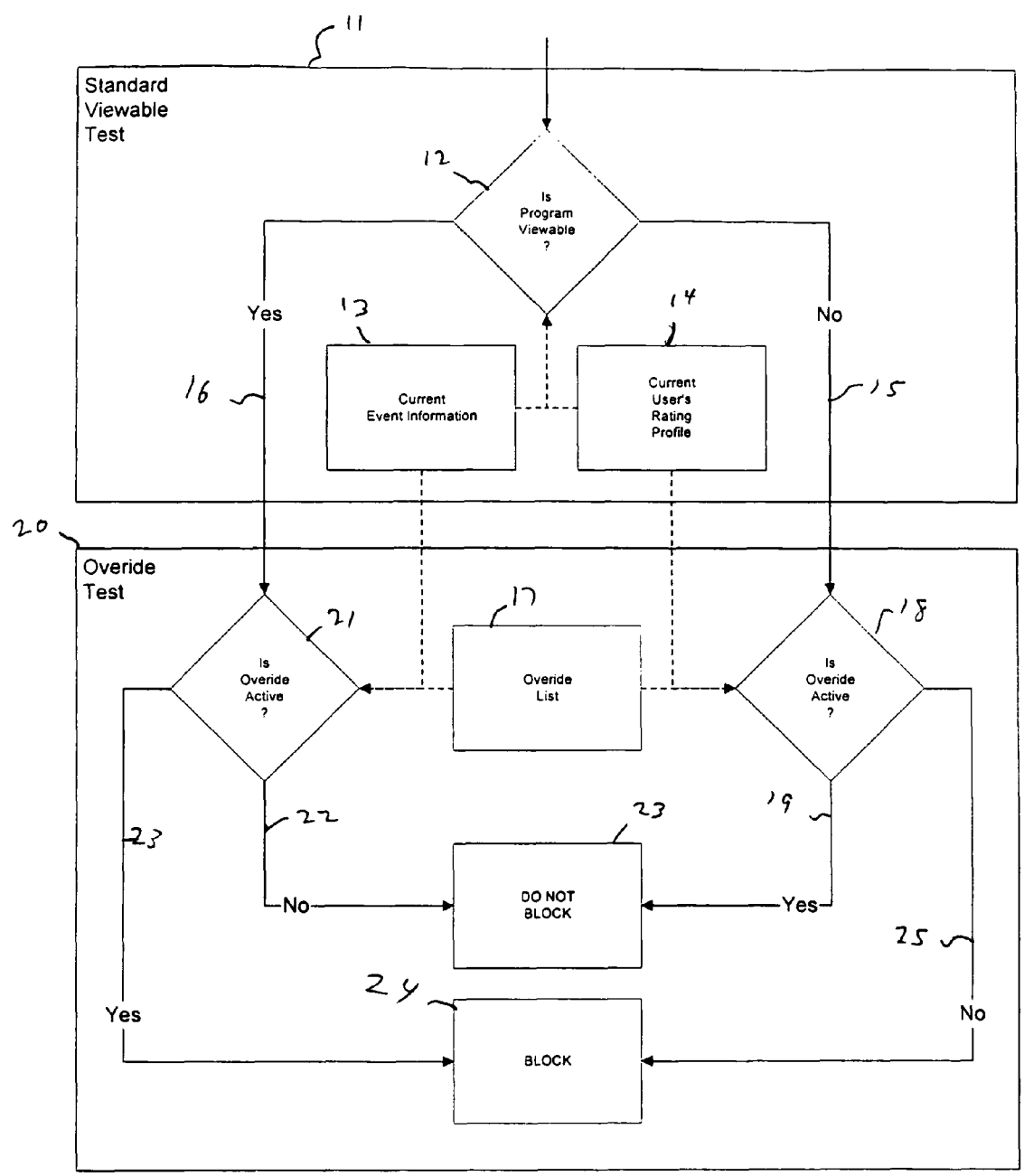
FIG. 1 shows, in block diagram form, a preferred system of the invention.

The invention will be illustrated with respect to a preferred embodiment of the invention, but the invention should not be construed as limited thereto. For example, a television receiver will be illustrated, but the invention is also applicable to other types of video processing systems such as those with display devices such as television sets, and those without display devices but suitable for coupling to display devices, e.g., set-top boxes (e.g., direct broadcast satellite (DBS) signal receivers and video recorders such as VCRs). In general, the invention is applicable to any system, device or apparatus that employs ratings control or spending limits or other criteria to permit or deny access to video or audio broadcasts or recordings.

As shown in the block diagram in FIG. 1 wherein a child's profile is active in the system, the standard viewable test 11 is run by the processor to determine initially if the program is viewable 12. The processor receives both current event information 13 and the current user's rating profile 14 which has previously been entered by the supervisor who has the password. The current event information can be received from the stripper, system clock, or other sources, and comprises the program ratings information, time length, pay per view cost, and the like. The current user's rating profile contains all of the ratings, spending, accumulated view time, and similar information associated with the currently authorized viewer.

To illustrate the invention, we first assume a case wherein the supervisor of the system who has the password wants to allow a certain program to be viewed by the child but the program's rating is above the allowed limit. The supervisor selects "override" from a list of displayed options called up when Program mode is selected using a remote controller. The supervisor is then challenged to enter the correct password to enter an override in the override list 17. In one example, the supervisor identifies a certain program by the channel, the start and stop time, and the Child profile in cases where the system allows alternative profiles.

The system displays a screen which calls for:
Program Identifier (for instance channel);
Start and Stop Time; and
Profile After the supervisor accepts the changes and exits the program mode, the override is recorded in the system's memory in the override list 17. Later, when the television is tuned to a channel at the time the program is being broadcast and the system is set to the child's profile, the Standard viewable test 11, based upon the program's rating in the current event information 13 and the child's profile 14 rating limit, is executed to initially determine if a program is viewable 12; in this example it is NOT viewable 15. At this point according to the invention, the override is determined by the processor to be active 18 when the override test logic 20 is entered, and since the program matches the Program Identifier in the Override List 17 and the system is within the Start and Stop Time for the program event and the current profile is the child profile, the Standard Decision to NOT 15 view this program is overridden and the program is now viewable 19. After the override expires it is removed from the list by the processor logic.

In a second example, the supervisor wants to temporarily disallow all programs to be viewed by any profile at a given time in the evening. The supervisor enters the program mode with the remote controller, selects ratings control, enters a correct password, and then the override list 17. The system challenges the supervisor to enter the correct password to enter an override in the override list. The supervisor identifies all programs beginning at a certain time, say 11:00 PM, and selects all profiles.

The screen display would appear as follows:
Override List Contents:
All Program Identifiers (for instance channel)
Start Time (11:00 pm on a certain date) with No Stop Time
All Profiles Later, at 11:00 PM, when the television is on and set to any profile, even the Parent profile, the Standard determination 11 based upon the program's rating received from the current event information 13 and the current user's profile rating limit 14 occurs to determine if a program is viewable; in this illustration it is 16. The override test 20 is entered and override logic 21 is applied by the system to test whether to override the Yes returned by the Standard viewable test 11. Assuming the program matches the All Program Identifier in the Override List Contents 17 and the time and date for the profile includes the Start Time for the program event and since the current profile 14 matches the All Profile Identifier in the override list 17, then the program's Standard determination of viewable 16 is passed through the override active test 21. Since the outcome of test 21 is affirmative 23 the program is now blocked 24.

In another illustration the supervisor of the system wants to allow programs to be viewed by the current profile at a given time in the evening, for example by the babysitter after bedtime for the children. The supervisor enters the override list 17. The supervisor identifies all programs beginning at a certain time, say 11:00 PM, and selects all profiles, and removes all limits until the stop time. The screen display is as follows:
Override List Contents:
All Program Identifiers
Start Time (11:00 pm on a certain date) and Stop Time
All Profiles The Standard determination 11 based upon the profile rating limit 14 and current event information 13 occurs to determine if a program is viewable and in this illustration it is NOT 15. The override logic 18 is then entered and since the program matches the All Program Identifier in the Override List Contents 17 and since the program is within the override window of time and date, the Standard determination of NOT viewable 15 is overridden 19 and the program is now viewable (unblocked) 23. The positive response from the override active test reverses the outcome of the standard viewable test. If the override was not active 25 in this case, the initial no 15 would remain in force and the program would be blocked 24.

In another illustration, the supervisor of the system wants to allow programs to be purchased by the child's profile at a given time in the evening for only one evening. A limit for the child's profile of purchasable limit of $0.00 can be overridden for the one evening and placed at $10.00. The supervisor, after successfully entering a password, enters an override in the override list 17 by identifying All programs beginning at a 6:00 PM to 11:00 PM on the selected date or day, and selects the child's profile. The screen display would appear as follows:
Override List Contents:
All Program Identifiers
Start Time 6:00 PM on a certain date and Stop Time of 11:00 PM on same date
Child profile The Standard determination 11 based upon the profile spending limit within normal profile 14 occurs to determine if a program is viewable and in this case it is NOT 15. The override logic 18 within the processor is entered. Assuming the program matches the All Program Identifier in the Override List Contents 17 and the program is within the override window of time and date and the purchase cost is less than the override cost of $10.00 then the purchase is allowed 19 and the program is unblocked 23. The Standard determination of NOT viewable 15 is overridden 19 and the program is now viewable 23.

The temporary override feature of the invention is also applicable to apparatus, systems, methods, and processors which have a view time limit feature wherein the supervisor can set a maximum total daily view time for a profile, for example the parent can set a maximum of one hour of view time per weekday and two hours per weekend day for a child's profile. If the parent wishes to reward a child for doing his or her homework, the parent may wish to allow extended view time for one day but not wish to change the normal view time limits in the profile. This invention would permit a change to the maximum view time for a single day, or combination of days, but then automatically restore the normal view time limitation after the selected day or days are over.

While this invention has been illustrated and explained in sufficient detail so that those skilled in this art can readily make and use it, various alternatives, modifications, and improvements which are within the scope and spirit of the invention should become apparent.

The invention claimed is:

1. A system comprising:
    a video signal processor for producing an output signal suitable for coupling to a display device to produce a plurality of images for display to at least one viewer;
    a supervisor control system operable by a supervisor to create at least one viewer profile identifying images to be blocked from display to said at least one viewer;
    said supervisor control system operable by said supervisor to select a specific program having a rating above a set rating for blocking programs applicable to said viewer profile such that said select program is unblocked for the duration of the program while the other of said plurality of images for display are blocked according to said viewer profile, whereby upon completion of said selected specific program, said supervisor control system identifies images to be blocked according to said at least one viewer profile.

2. The system according to claim 1 wherein said images correspond to programs and said viewer profile identifies programs to be blocked from display to said at least one viewer.

3. The system of claim 1 wherein said images correspond to channels and wherein said viewer profile identifies channels to be blocked from display to said at least one viewer.

4. The system of claim 1 wherein said viewer profile identifies at least one time period during which all images are to be blocked from display to said viewer.

5. The system of claim 1 wherein an override list is formed including a selection of a plurality of programs having a rating above a set rating for blocking programs applicable to said viewer profile by a user and said override list is applicable to at least one corresponding viewer profile such that at least one image to be blocked according to said viewer profile is unblocked and at least one other image not blocked according to said viewer profile is blocked.

6. The system of claim 5 wherein said override list is temporarily applied to at least one viewer profile.

7. The system of claim 5 wherein said override list is applied for a period of time specified by said supervisor.

8. The system of claim 5 wherein said override list includes at least one override selected from the group comprising: a) at least one channel blocking override, b) at least one time period blocking override, c) at least one rating blocking override, d) at least one program blocking override, e) at least one spending limit override, f) at least one image content blocking override, g) at least one total view time limit override.

9. The system of claim 5 wherein said at least one override list is applicable to a plurality of viewer profiles.

10. The system of claim 5 further including means to display to a viewer a blocking status based upon said override list.

11. The system of claim 1 wherein said control system is operable by said supervisor to create a plurality of override lists applicable to said at least one viewer profile.

12. The system of claim 1 wherein said control system is operable by said supervisor to create a plurality of override lists applicable to a plurality of viewer profiles.

13. The system of claim 1 wherein said supervisor control system for producing an output signal includes at least one item selected from the group comprising: television receiver, set top box, video cassette recorder tuner.

14. In a video signal processing system for producing an output signal suitable for coupling to a display device to produce images to be displayed to at least one viewer, a method for blocking viewing by at least one viewer comprising the steps of;
    creating a viewer profile identifying images to be blocked for a corresponding viewer;
    selecting a program having a rating above a set rating for blocking programs to be applied to said viewer profile so as to allow said corresponding viewer to view said select program for the duration of said program;
    monitoring blocking of the other of said images to be displayed according to the viewer profile; and
    monitoring blocking of viewing of all images according to the viewer profile upon completion of said selected program.

15. The method of claim 14 including the steps of forming an override list upon selection of a plurality of programs and storing said override list in a memory of said system.

16. The method of claim 15 including a step of specifying a time period for application of said override list to said viewer profile.

17. The method of claim 15 including a step of applying said override list to said viewer profile at the start of said specified time period and stopping application of said override list to said viewer profile after expiration of said specified time period.

18. The method according to claim 14 wherein said images comprise programs and said viewer profile identifies programs to be blocked from display to said at least one viewer.

19. The method of claim 14 wherein said images comprise channels and wherein said viewer profile identifies channels to be blocked from display to said at least one viewer.

20. The method of claim 14 wherein said viewer profile identifies at least one time period during which all images are to be blocked from display to said viewer.

* * * * *